April 3, 1956 F. W. WILSON 2,740,515
CONVEYOR APPARATUS
Filed April 6, 1953 3 Sheets-Sheet 1
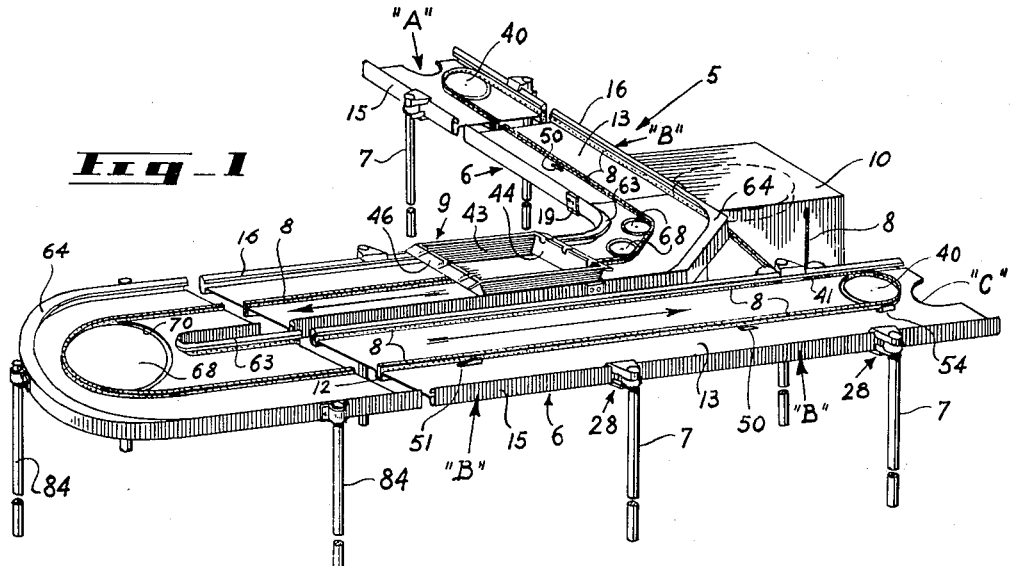
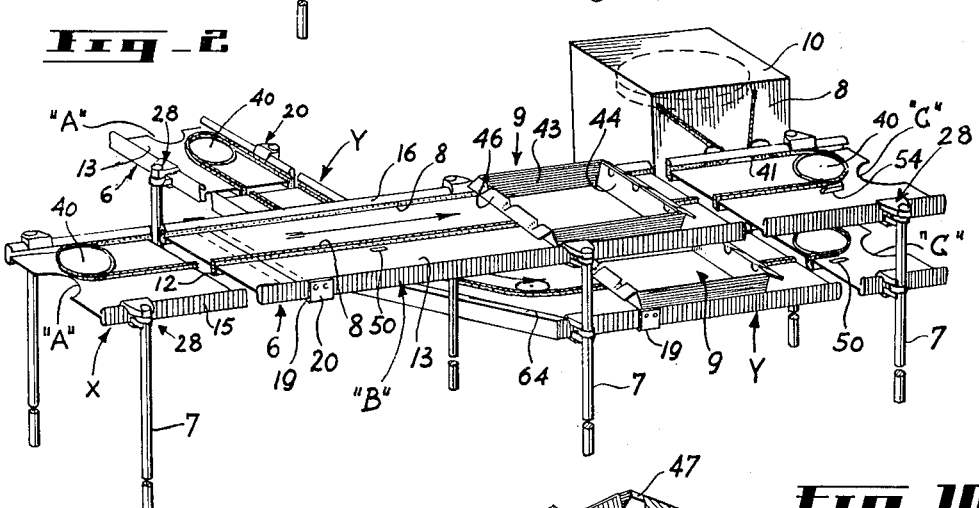
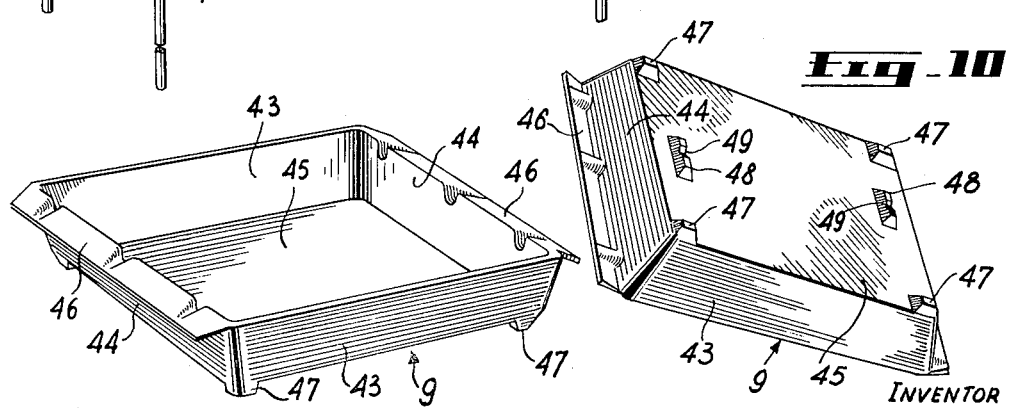
INVENTOR
F. W. WILSON
By Fetherstonhaugh & Co.
ATTORNEYS

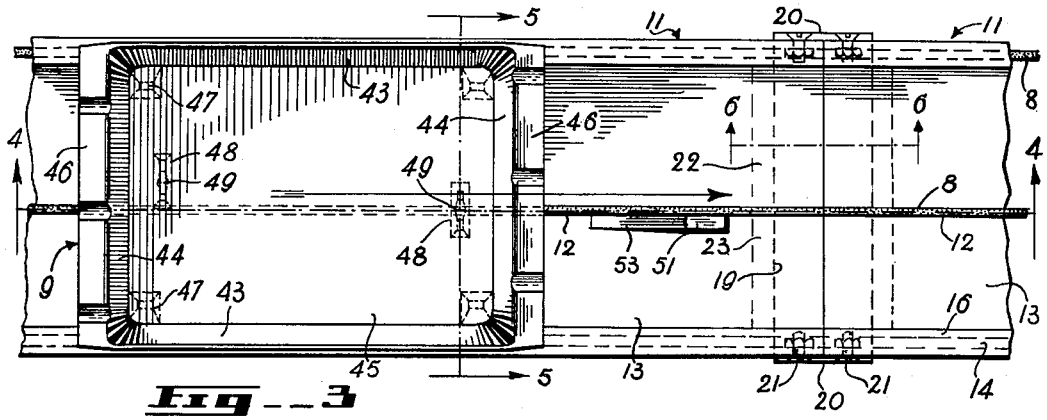
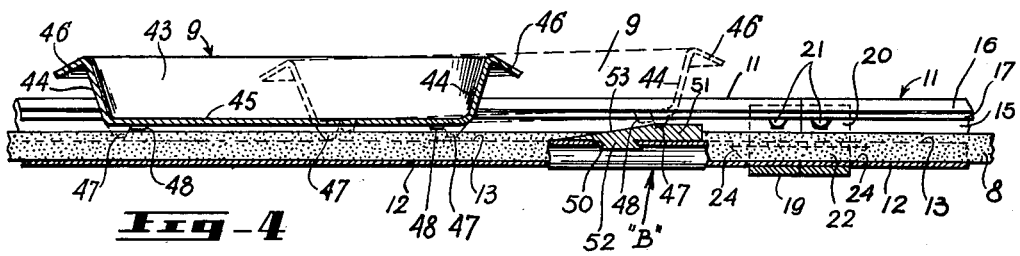
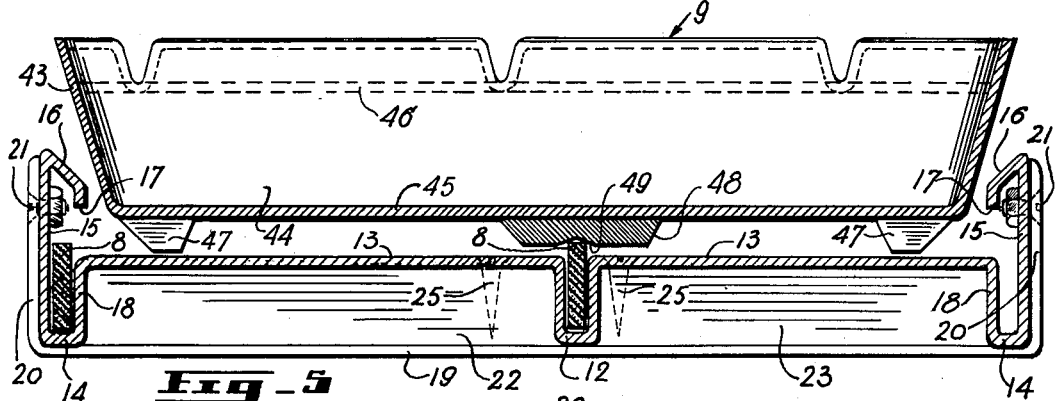
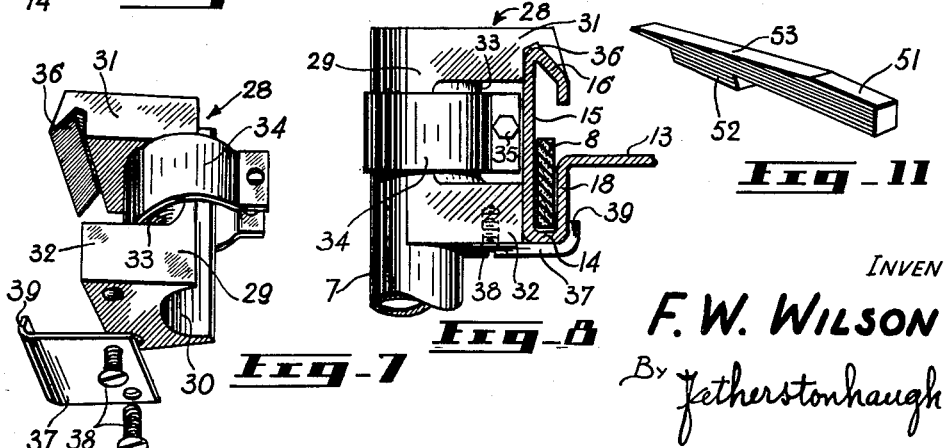

April 3, 1956 F. W. WILSON 2,740,515
CONVEYOR APPARATUS
Filed April 6, 1953 3 Sheets-Sheet 3
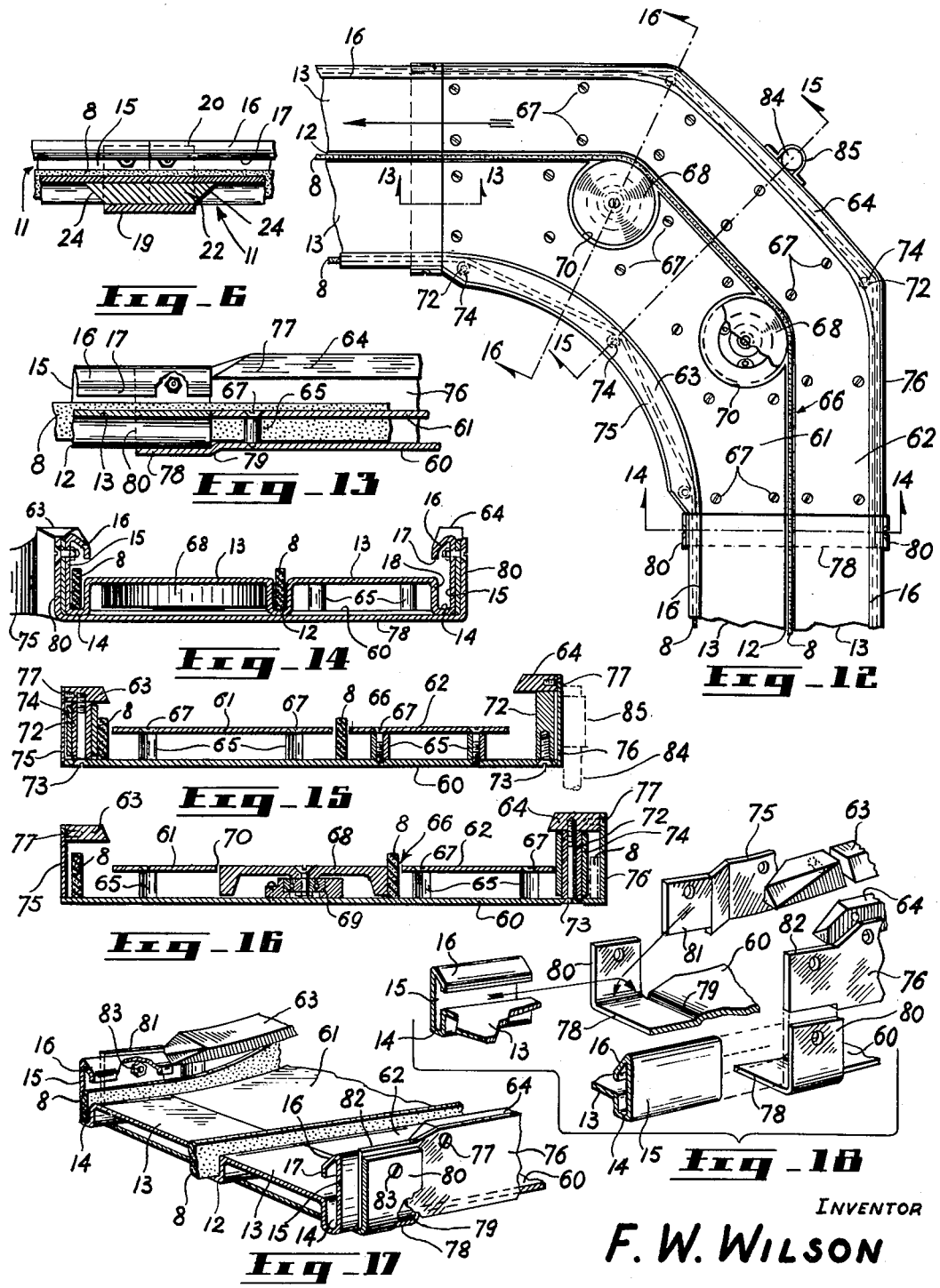
INVENTOR
F. W. WILSON
BY Fetherstonhaugh & Co.
ATTORNEYS United States Patent Office 2,740,515
Patented Apr. 3, 1956

2,740,515
CONVEYOR APPARATUS

Frederick W. Wilson, Westmount, Quebec, Canada, assignor to Williams & Wilson Limited, Montreal, Quebec, Canada Application April 6, 1953, Serial No. 346,867

14 Claims. (Cl. 198—19)

This invention relates to conveyor systems for transporting material from a distributing centre to numerous locations remote from said distributing centre.

The primary object of this invention is to provide a conveyor apparatus which will carry material, jointly required by several operators, in a conveyance to each operator in succession so that each operator in turn may be enabled to carry out an allotted assignment and then pass on the material to the next operator without unnecessary delay.

In large manufacturing and sales organizations a great deal of clerical entry work has to be done. To accomplish this the office staff must be composed into a number of departments, for example, order, shipping, purchasing, receiving, sales, stock, accounts receivable and accounts payable, departments, etc. Each of these departments, while having their separate functions, are required to co-operate with at least several other departments in order that the organization may function as a unit. According to conventional systems, when an order is received, various entries must be made in several departments to obtain a complete record of the order from the time it is received until it has been delivered. This also applies in the purchase of materials to be used or sold by the organization. While the various departments of the sales and the purchasing divisions normally function independently of each other, there is an interdependency among them in which delays in one result in delays along the line. This also applies to interdepartmental delays within a division.

When an order is received or a purchase is required it is customary to have the necessary forms relating thereto, delivered by messenger from one department to another as well as from one division to another. Thus, when the first department receives a batch of forms for entries of the orders to be recorded, an operator makes the necessary entries and then sets them aside for pick-up by a messenger. In the meantime the succeeding departments remain idle until delivery is made to them. Then too, it happens that an operator in a department may receive a second and a third batch of forms before completion of the first batch. This results in the building up of a back-log and the top or latest batch receives immediate attention while certain of the original batch remains at the bottom of the pile. In this manner a considerable lapse of time may occur between the receiving and the filling of an order because of the back-log in one department. If such conditions were repeated down the line the efficiency of the organization would be disrupted and general dissatisfaction would result.

The present invention proposes to overcome these organization difficulties by allocating each division to an area according to a floor plan and then installing one or more conveyor systems so that the departments of each division may be arranged at successive stations along the length of one or more conveyor systems according to the sequence in which they normally receive the material for recording the necessary entries assigned to an operator of that department. A dispatcher at a distributing centre is required to allot a predetermined number of forms in a batch to the first operator of a department at an intermediate station along the conveyor system. The number of forms would be determined by the average capacity of the operators. The batch is deposited in a tray which is then mounted on the conveyor system and which delivers the tray to the first operator where it is held at that station on the conveyor system until the operator has completed work on the batch. Upon completion, the operator then releases the tray and it is carried to the next station where a similar operation is completed in like manner.

The dispatcher is responsible for delivering each batch at intervals which would normally give each operator sufficient time to complete one batch before the arrival of the next. However, in the event that an operator does not complete the work on a batch before the arrival of the next, provision is made whereby succeeding batches will be held at that station without affecting the completion of the preceding batch. With this arrangement, not only is the work completed in the sequence in which it is received, but also the completed batch may then be immediately dispatched to an operator at the next station without unnecessary time loss.

The system also provides for rapid inspection throughout a division by a supervisor so that a tie-up of one department along the line can be quickly investigated and remedied. It frequently occurs that certain material is not intended for certain departments. Each station is therefore provided with a removable stop member so that trays bearing certain identifications may be allowed to by-pass those stations not requiring to handle the material therein by removal of the stop member. This speeds up the ultimate completion of the task by each division of the organization.

The system may also have other practical applications, such as, transporting various articles in a machine shop or other work shop. For example, on an assembly line, the apparatus may be employed to convey to different stations parts to be used in the assembly of a unit.

Other objects, advantages, and features characteristic of my invention will be understood more readily from the following detailed description taken in connection with the accompanying drawings, in which—

Fig. 1 is a perspective view of a conveyor apparatus embodying my invention.

Fig. 2 is a perspective view showing a modified form of my invention.

Fig. 3 is a fragmentary plan view of a part of my conveyor apparatus.

Fig. 4 is a sectional view taken along the lines 4—4 of Fig. 3.

Fig. 5 is a sectional view, enlarged, taken along the lines 5—5 of Fig. 3.

Fig. 6 is a sectional view taken along the lines 6—6 of Fig. 3.

Fig. 7 is a perspective view of a clamping device shown in Fig. 1.

Fig. 8 is an elevational view showing the clamping device in assembled relation.

Fig. 9 is a perspective view showing the upper side of a tray.

Fig. 10 is a perspective view of the under side of a tray.

Fig. 11 is a perspective view of a stop member shown in Figs. 3 and 4.

Fig. 12 is a plan view of a corner section of the conveyor shown in Figs. 1 and 2.

Fig. 13 is a sectional view taken along the lines 13—13 of Fig. 12.

Fig. 14 is a sectional view taken along the lines 14—14 of Fig. 12.

Fig. 15 is a sectional view taken along the lines 15—15 of Fig. 12.

Fig. 16 is a sectional view taken along the lines 16—16 of Fig. 12.

Fig. 17 is a fragmentary view in perspective of a section of the conveyor shown in Fig. 12.

Fig. 18 is an exploded fragmentary view of the component parts shown in Fig. 17.

Referring more particularly to Fig. 1 of the drawings, 5 generally indicates a conveyor system comprising a trough 6 supported on legs 7 and an endless conveyor belt 8 mounted in said trough to convey trays 9 therealong. The belt 8 is actuated by a drive mechanism 10 at one side of the conveyor which continuously feeds the endless belt 8 along the length of the conveyor system.

The trough 6 is mainly composed of a plurality of lengths of straight trough sections 11. As will be seen in Fig. 5, each trough section is formed from a strip of sheet metal which is bent to provide an intermediate channel 12 in the upper surface and at one side of the longitudinal centre line of the trough floor 13, and side channels 14 paralleling said intermediate channel along opposite sides of the trough floor 13. Side channels 14 are formed by bending marginal portions of the sheet to define the inner, outer and bottom walls of the channel. The outer wall 15 of the channels 14 extends substantially above the level of the trough floor 13 and the marginal edges are bent inwardly and then downwardly to provide a downwardly inclined side rail 16 and a spaced vertically depending lip 17 overlying the inner side wall 18 of channel 14.

As shown in Figs. 3 to 6, the lengths of trough sections 11 are joined in abutting end-to-end relation by butt straps 19 which underlie the ends of two adjacent trough sections 11. The side arms 20 of the butt strap are secured to the outer surface of the trough side channel outer walls 15 by bolts 21 which extend through suitable openings at a point well above the floor of the trough so as to be substantially concealed by the overhanging marginal side rail 16 and lip 17. Spacer blocks 22 and 23 which are tapered along their side edges at 24, are interposed between the opposing surfaces of the troughs and butt strap on either side of intermediate channel 12. Blocks 22 and 23 are secured to the trough by screws 25. The tapering side edges 24 of the blocks tend to deflect any object coming in contact with the under surface of the trough so as to prevent accumulation of such objects at the joint between two trough sections.

The straight sections of conveyor trough 6 are supported on legs 7 which are secured to the trough by means of an adjustable clamping device 28. As will be seen in Figs. 7 and 8, clamping device 28 consists of a block 29 longitudinally grooved in one face, as indicated at 30, to partially surround the leg 7. The opposing face is transversely recessed so as to provide upper and lower lateral extensions 31 and 32 and an intermediate section 33 convexly curved in the longitudinal direction between said upper and lower extensions 31 and 32. A securing strap 34 encompasses the intermediate section 33 and leg 7 and is fastened by a bolt 35 which extends through openings in the outer extremities of strap 34 to secure the clamping device against vertical movement along the leg 7. The under side of upper extension 31 is angularly recessed adjacent its outer edge, as indicated at 36, to receive the upper, inturned extension 16 of the trough side channel wall 15 with the lower portion of wall 15 butted against the outer edge of the lower extension 32 of the clamping device 28. A clamping plate 37 is secured to the base of extension 32 by screws 38. Plate 37 underlies the base of channel 14 and is provided with an upturned lip 39 which engages the outer surface of the channel inner side wall 18 in retaining engagement when plate 37 is secured to the base of extension 32.

The endless belt 8 is disposed endwise along the length of intermediate channel 12 so that the upper edge of said belt projects above the upper surface of the trough floor 13, as shown particularly in Fig. 5. The belt passes around end pulleys 40 which are offset to one side so that the return portion of the belt may be carried along one of the parallel side channels 14 according to the offset of pulley 40. As seen in Fig. 1, side channel 14 has passageways 41 in the outer sidewall 15 through which the endless belt 8 is directed to and from the drive mechanism 10.

Belt 8 serves to transport trays 9 along the length of the conveyor to predetermined intermediate stations and eventually to the remote end of the conveyor. Each tray is provided with side and end walls 43 and 44 outwardly inclined from a bottom wall 45. The upper marginal portions of end walls 44 are provided with outward and downwardly inclined extension lips 46, the purpose of which will be more fully explained herebelow. The under side of bottom wall 45 is provided with feet 47 at the corners and with a block 48 substantially adjacent each end of the bottom wall 45. Blocks 48 are disposed on either side of the center line of the tray so that the block at the leading end of the tray will rest on the upper edge of belt 8 and the block at the trailing end will be disposed at one side of the belt regardless of which end of the tray becomes the leading end. Blocks 48 are grooved, as indicated at 49, at a point along the edge of same which permits the block at the leading end of the tray to rest on the belt with the upper edge of said belt in the groove so as to raise the feet 47 at the leading end slightly above the floor 13 of the trough. This gives a slight rearward inclination to the tray and frictional contact between the belt and the grooved portion of block 48 causes the tray to be drawn along the trough in the direction of travel of the belt and at the aforesaid inclined position.

The tray 9 serves to carry material from a starting point "A" (see Fig. 1) to any intermediate stations "B" and thence to a terminal "C" at the end of the conveyor. A slot 50 is provided in the floor 13 of the trough adjacent the intermediate channel 12 to indicate the location of an intermediate station "B." If an operator wants a tray to stop at a station "B," a removable stop ramp 51 having a bottom projection 52 is mounted on the trough with said projection 52 in slot 50 and with the upper inclined surface 53 of the ramp disposed so that the block 48 at the leading end of the tray 9 will ride up said inclined surface to break frictional contact between the block and the belt. With the inclination of the tray 9 both in travelling position and in the position on the inclined stop ramp, it will be appreciated that the lower edge of the lip 46 at the leading end of the tray will be higher than the lower edge of the lip 46, at the trailing end of the tray. Thus, in the event of crowding of trays along the length of the conveyor, for example at an intermediate station "B," the elevated leading lip 46 of a succeeding tray will ride up the inclined trailing lip 46 of a preceding tray to thereby break driving contact with the conveyor belt. When an operator at a station "B" has finished with a tray he merely sets the tray on the trough at a point beyond the station and in driving contact with the belt. If more material is not immediately required at that station the operator removes his stop ramp to allow the trays to pass on to succeeding stations. A stop ramp 54, similar to ramps 51, is also provided at terminal "C" which holds the trays out of driving contact with the belt until an operator has an opportunity to remove the trays for return to the starting point "A."

As previously stated, the trough is mainly composed of lengths of straight trough sections of the character previously described. However, where it is desired to provide a turn at a point in the length of the conveyor, the section is modified to accommodate a change of direction in the conveyor. As the composition of elements of this modified section are substantially the same for U-turn, as well as angle turns of any degree, I have deemed it necessary to illustrate in detail only one of these. Thus, in Figs. 12 to 18, I have illustrated the structural details of a trough section which provides for a right-angle change in direction of the conveyor. This section is composed of a base plate 60 on which are mounted trough floor plate members 61 and 62 and inner and outer shoulder members 63 and 64. The base plate 60 is disposed to lie in a horizontal plane with the bottom of the straight trough channels 12 and 14 to serve as a continuing support of the belt as it is carried therealong. Trough floor plates 61 and 62 are supported in spaced side-by-side relation to one another and in spaced relation to the base plate by pillars 65 which position these plates 61 and 62 in a horizontal plane with the surface of the straight trough floor 13. The adjacent inner edges of plates 61 and 62 are spaced apart to provide a belt passage 66, the terminal portions of which are aligned with the channels 12 at opposite ends thereof. Suitable bolts 67 extending through pillars 65 secure the plates 61 and 62 to the base plate 60. The outer edges of plates 61 and 62 terminate a substantial distance inwardly of the corresponding edges of plate 60 to provide space for passage of the return portion of the belt. A pulley 68 mounted in a bearing 69 is carried by base plate 60 at the point or points of change in direction of the belt. Plate 61 is provided with a suitable opening 70 which permits the upper surface of pulley 68 to lie in the plane of the upper surface of plates 61 and 62. In the case of a U-turn (see Fig. 1) a single pulley is required which allows the belt to travel around the curve without frictionally engaging the sides of the belt passage 66. This arrangement is necessary where sections of the conveyor are running in opposite parallel directions and in close relation. However, where space permits, it is preferable to complete a turn by successive directional changes of lesser degrees. Thus, in a right-angle curve (see Fig. 12) two directional changes of 45° reduces the hazard of the belt slipping out of the tray block groove and subsequent disengagement between the belt and block.

The inner and outer shoulders 63 and 64 are preferably of cast metal which is curved along one side to provide a side bearing surface against which the tray is guided around the corner. Each shoulder is supported on pillars 72 and secured to plate 60 by bolts 73. It will be noted that the shoulders 63 and 64 are elevated above the side rails 16 and that their bearing surfaces are at a steeper angle to prevent the tray from riding up on the shoulders and thereby breaking frictional contact with the belt. Certain of the pillars 72 are provided with sleeves 74 which serve as rollers which engage the return portion of the belt to prevent frictional contact of the belt around the curve. The sides of the curved trough section are closed by inner and outer side plates 75 and 76 which are secured to the outer side walls of shoulders 63 and 64 by screws 77 so that the skirt portion of said side plates overlaps the marginal side edges of base plate 60.

Figs. 17 and 18 clearly illustrate the manner in which the corner trough sections are secured to the straight trough sections at opposite ends thereof. Each end of base plate 60 is provided with a marginal portion 78 which is bent downwardly and then outwardly at 79 to support the adjacent end of a straight trough section with the bottom wall of channels 12 and 14 in the horizontal plane of said base plate proper and with the floor 13 of the straight trough butted against the floor plate members 61 and 62 and in the same horizontal plane. This provides continuity with the channels 12 and 14 and the trough floor at opposite ends of the curved trough section. The marginal portion 78 is provided with vertically disposed side flanges 80 to which the side walls 15 of the straight trough and extensions 81 and 82 of side plates 75 and 76 respectively are secured by bolts 83. The corner trough sections are supported on legs 84 which are secured to said corner trough sections by bail-shaped straps 85 which surround the legs 84 with terminal flanges of strap 85 flatly secured to the side plates 75 and 76.

In Fig. 2 I have shown a modified conveyor system. In effect, this comprises two conveyors driven by a common driving mechanism 10. The upper conveyor X mounted on legs 7 is shown to be a straight conveyor, while the lower conveyor Y is shown to approach the conveyor X at an angle and then parallel same at a lower level. The parallel portion is supported by the legs 7 of the first mentioned conveyor. With this arrangement, work emanating from different sources, can be channelled to common intermediate stations. With this particular arrangement, the importance of tapering the edges 24 of spacer blocks 22 and 23 will be appreciated. For example, a tray, when travelling along the lower conveyor Y beneath conveyor X, may have a stack of papers therein the top ones of which would brush against the under surface of the uper trough. These papers are deflected by the tapering edges 24 and pass beneath the butt joint of two trough sections instead of being dislodged from the tray.

While, in Figs. 1 and 2 I have shown certain modified conveyor systems, it will be appreciated that these are for illustration purposes only. It will be appreciated, therefore, that my conveyor apparatus may be adapted to suit any floor plan in an office or plant where it is desirous of conveying letters, invoices, or any other material from station to station throughout the floor. For example, the conveyor may have a common starting and terminal station, with intermediate stations at various locations on the floor. Then, again, two conveyors may be operated by separate driving mechanisms and may be parallel either in a vertically spaced or horizontal plane for one or more intermediate sections along the length thereof.

Although I have illustrated the conveyor systems with horizontally disposed troughs, it is also contemplated to dispose at least sections of the troughs along inclined planes. Provided that the inclined plane is gradual, there will be no alteration in the mechanism other than the inclination of the trough for the reason that the weight of the conveyor belt plus the tension applied by pressure of the belt against the pulleys 40 will serve to retain the belt in the intermediate channel provided therefor. Even if the belt should rise slightly above its normal position in the channel 12, this would not affect the operation of the conveyor system provided that the tray remains within the side walls of the conveyor trough.

In the event that it is desirable to have certain batches, records, correspondence, or the like, by-pass regular stations for delivery to a special station along the line of the conveyor, the carriers or trays 9 may be modified to suit this requirement. Referring particularly to Fig. 10, as previously pointed out, the block 48 of a regular tray 9 has lateral extensions on either side of the groove 49. Normally at least one of these lateral extensions is disposed in the path of the regular stop members 51 along the length of the conveyor trough, which lateral extension rides up the inclined portion 53 of said stop members 51. The special trays designed to by-pass the regular stops would be provided with a block similar to block 48 but having no lateral extensions engageable with the regular stop members. At a special station a special stop member similar to stop member 51 would be located in the trough parallel to, but outwardly offset from the longitudinal line of the regular stops 51. The special trays would then be provided with an additional block which would be in the path of the special stop member at said special station. This would permit the uninterrupted travel of a special tray past the regular stations along the conveyor system to the special station where it would be held by the special stop member at that station. Similarly, if the special station was not provided with a stop member located along the longitudinal line of the regular stop members, the regular trays would by-pass this special station. However, a special station may also be provided with a regular stop member located along the longitudinal line of the regular stop members in the event that it is desirable to deliver both the "regular" and the "special" trays thereto. The special trays may also be provided with suitable markings to identify the same or may be distinctively coloured or patterned to render it distinguishable from the regular trays.

What I claim is:

1. A conveyor apparatus comprising an elongated trough including a horizontally disposed floor and retaining walls extending in the longitudinal direction at either side of said floor, a longitudinally extending guideway in said trough floor intermediate the width thereof, a second longitudinally extending guideway in said floor adjacent one of said retaining walls, an endless belt trained along said first and second mentioned guideways so that a marginal portion of said belt projects above the upper surface of said trough floor, driving means for moving said endless belt in one direction along said first guideway and in a return direction along said second guideway, and a carrier member slidable along the floor of said trough for drive connection only with said belt portion trained along said first mentioned guideway, said carrier member being frictionally engageable with the projecting portion of said belt trained along said first mentioned guideway for sliding movement along the length of said trough in response to movement of said belt along said first mentioned guideway.

2. A conveyor apparatus as set forth in claim 1, including a stop member mounted intermediate the length of said trough at one side of said first mentioned guideway and adapted to break frictional contact between said carrier and said belt at a predetermined point along the length of said trough.

3. A conveyor apparatus as set forth in claim 1, in which said first mentioned guideway is parallel to the longitudinal centre line of said trough floor at one side thereof and in which said carrier member is provided with belt-engaging members adjacent opposite ends thereof, each of said belt-engaging members being offset with respect to the longitudinal centre line of said carrier member to render said carrier member reversible with respect to the trough whereby the belt-engaging member at the selected leading end of the carrier member will be engageable with said belt portion trained along said first mentioned guideway and the remaining belt-engaging member will be out of engagement with said belt.

4. A conveyor apparatus as set forth in claim 3, in which said belt-engaging member at the leading end of said carrier member when mounted on said belt portion trained along said first mentioned guideway is adapted to raise the leading end of said carrier member above the floor level of said trough with the trailing end of said carrier member in sliding contact with said trough floor to thereby incline said carrier member rearwardly whereby the leading end of a succeeding carrier member overtaking a preceding carrier member will ascend the trailing end of the latter until contact is broken between said succeeding carrier member and said belt.

5. A conveyor apparatus comprising an elongated trough, said trough including a plurality of trough sections, each being formed from a strip of sheet metal shaped to provide a horizontal floor, a longitudinally extending channel in said floor intermediate the width thereof, a side channel in said floor along the length of at least one side of said trough and retaining walls along the length of each side and projecting above the floor level of said trough, said trough sections being disposed in end-to-end relation so that corresponding parts are in alignment, an endless belt trained along said intermediate channel and one of said side channels, said belt being disposed with one side edge in sliding contact with the bottom of said channels and the other side edge projecting above the surface of said trough floor, driving means for moving said endless belt along said intermediate channel in one direction and along said side channel in a return direction, and a carrier member slidable along the floor of said trough, said carrier member being frictionally engageable only with the projecting portion of said belt trained along said intermediate channel for sliding movement of said carrier along the length of said trough in response to movement of said belt along said intermediate channel.

6. A conveyor apparatus as set forth in claim 5, including at least one removable stop member mounted on said trough floor intermediate the length thereof at one side of said intermediate channel, said stop member being shaped to provide an inclined ramp positioned in the path of said moving carrier member whereby the impelling force of said belt portion in said intermediate channel on said carrier member causes the latter to ascend said inclined ramp until contact is broken between said carrier member and said belt.

7. A conveyor apparatus as set forth in claim 6, in which said trough floor is provided with at least one opening therethrough adjacent said intermediate channel and at a predetermined point along the length thereof and in which said stop member is provided with a projection on the under side thereof which is receivable in said floor opening to secure said stop member against movement along the length of said floor.

8. A conveyor apparatus as set forth in claim 5, in which said intermediate channel is parallel to the longitudinal centre line of said trough floor at one side thereof and in which said carrier member is provided with belt-engaging members projecting downwardly from the under side thereof adjacent opposite ends of said carrier member, each of said projecting belt-engaging members being offset with respect to the longitudinal centre line of said carrier member to render said carrier member reversible with respect to the trough whereby the belt-engaging member at the selected leading end of said carrier member overlies said belt portion in said offset intermediate channel in frictional engagement with said belt portion and the remaining belt-engaging member at the trailing end is inoperatively placed at one side of said belt.

9. A conveyor apparatus as set forth in claim 5, in which said carrier member is provided with a downwardly projecting belt-engaging member adjacent the leading end thereof, said belt-engaging member being mountable on said belt portion in said intermediate channel in frictional contact therewith so as to elevate the leading end of said carrier member above said trough bed with the trailing end of said carrier member in sliding contact with said floor.

10. A conveyor apparatus as set forth in claim 9, in which the trailing end of said carrier member is provided with an inclined surface whereby the elevated leading end of a succeeding carrier member overtaking a preceding carrier member is enabled to ascend said inclined surface by the impelling force exerted on the succeeding carrier member by movement of the belt portion along said intermediate channel until frictional contact between said carrier member and belt portion has been broken.

11. A conveyor apparatus as set forth in claim 5, in which said retaining walls are formed as a continuation of the outer defining wall of said side channels, said outer side wall projecting above the trough floor and having its upper marginal portion bent inwardly to provide an inclined upper surface toward said trough floor and then downwardly to provide a depending lip overlying the inner defining wall of said side channel and in spaced relation thereto to thereby retain said carrier member out of frictional contact with the return portion of said endless belt riding in said side channel.

12. A conveyor apparatus as set forth in claim 11, including supporting legs arranged along either side of said trough and clamping members adjustably mounted on said legs for vertical adjustment of said trough, said clamping members having a projection adapted to overlie the inclined upper surface of said retaining wall in contact therewith and a clamping plate removably secured to the clamping member in vertically spaced relation to said clamping member projection, said clamping plate being provided with a marginal extension adapted to underlie the bottom wall of said side channel in clamping engagement therewith.

13. A conveyor apparatus as set forth in claim 5, including at least one curved trough section, said curved trough section comprising a base plate having its upper surface in a horizontal plane with the surface of the bottom wall of said intermediate and side channels, a pair of floor plate members mounted in side-by-side relation and in spaced relation to said base plate in the horizontal plane of said first mentioned trough floor, means supporting said floor plates on said base plate, said floor plates having their adjacent marginal edges spaced apart to provide a belt passageway as a continuation of the intermediate channel and having their outer marginal edges inwardly offset with respect to the marginal edges of said base plate to provide passageways for the return portion of said belt as a continuation of said side channels, carrier retaining walls mounted over said side passageways and in spaced relation thereto, and at least one pulley mounted on said curved section base plate and at one side of said first mentioned passageway to permit movement of the belt around the curve of the passageway without frictional contact with the sides of said curve, and means for securing one end of said curved section in end-to-end relation with said first mentioned trough sections to provide continuity with said channel and trough floor surfaces.

14. A conveyor apparatus as set forth in claim 13, including rollers mounted at one side of said second mentioned passageway around which the return portion of said belt is trained in contact therewith to permit movement of the return portion of said belt around the curve of said passageway without frictional contact with sides of said curve.

References Cited in the file of this patent

UNITED STATES PATENTS

| | | |
|---|---|---|
| 1,420,115 | Lange et al. | June 20, 1922 |
| 1,476,936 | Walden | Dec. 11, 1923 |
| 2,280,221 | Dambach | Apr. 21, 1942 |
| 2,305,009 | Jarrett et al. | Dec. 15, 1942 |
| 2,317,675 | De Burgh | Apr. 27, 1943 |